(No Model.)
W. H. McWHIRTER.
ANIMAL TRAP.
No. 543,263. Patented July 23, 1895.
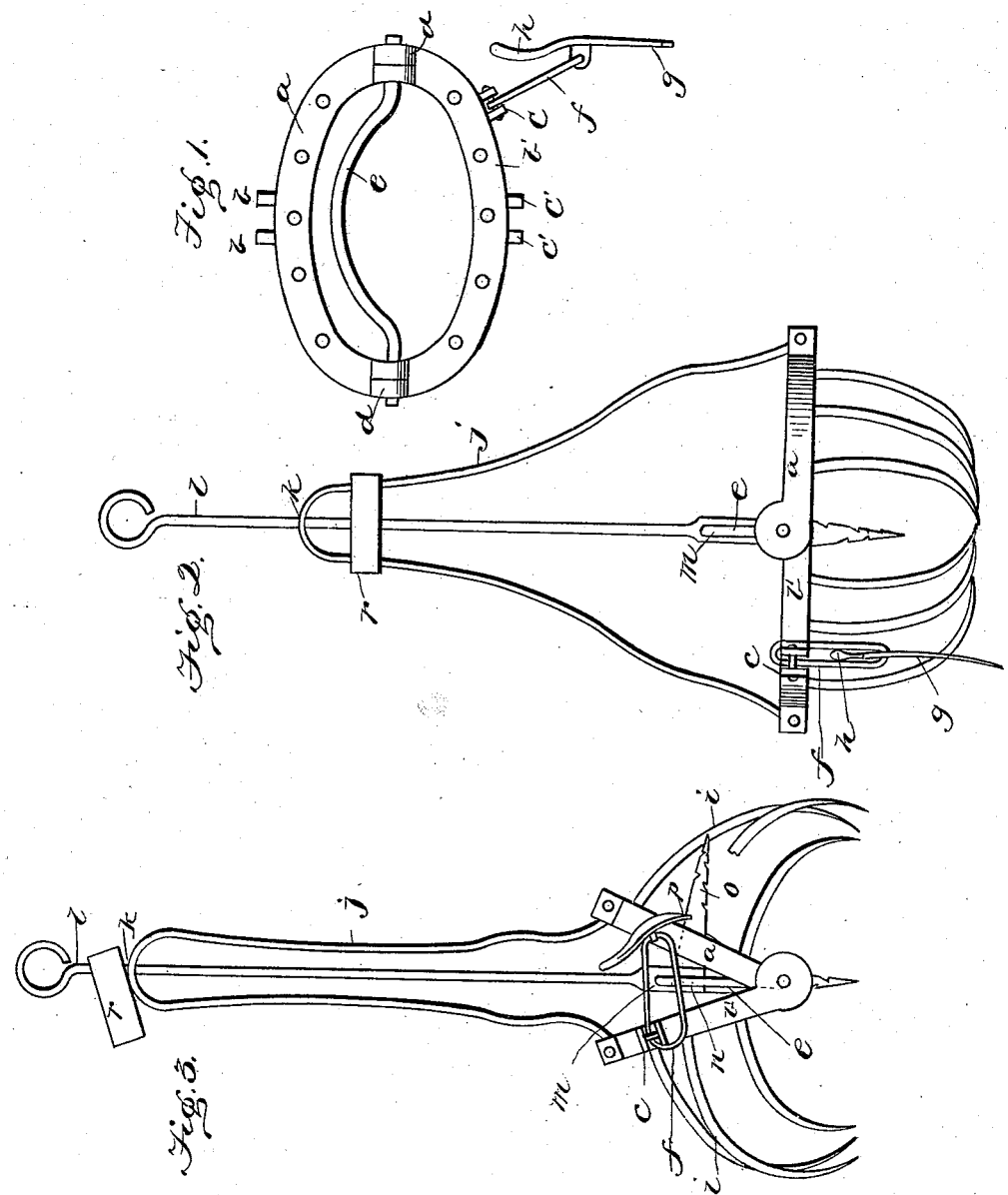
Witnesses:
A. J. Suk.
R. E. Rabbitt.
Inventor
W. H. McWhirter
By John S. Suffie
Attorney

UNITED STATES PATENT OFFICE.

WILLIAM HENRY McWHIRTER, OF PONTOTOC, MISSISSIPPI.

ANIMAL-TRAP.

SPECIFICATION forming part of Letters Patent No. 543,263, dated July 23, 1895.

Application filed April 19, 1895. Serial No. 546,393. (No model.)

*To all whom it may concern:*

Be it known that I, WILLIAM HENRY MC-WHIRTER, a citizen of the United States, residing at Pontotoc, in the county of Pontotoc and State of Mississippi, have invented certain new and useful Improvements in Animal-Traps; and I do hereby declare the following to be a full, clear, and exact description of the invention, such as will enable others skilled in the art to which it appertains to make and use the same.

My invention relates to animal-traps; and it consists in the novel construction and arrangement of its parts.

The trap is called "Tarantula," because it resembles a species of spider by that name. It will catch fish, rats, coons, minks, wildcats, bear, or anything that will bite or take bait. It is easily thrown, and never misses its victim; it hangs when set, and decoys rather than frightens the animal. It advances upon the animal two inches when thrown, and draws or tends to draw the head of the animal within its jaws when it is thrown. On account of its construction, the harder the animal pulls against it the tighter it grasps it.

In the accompanying drawings, Figure 1 is a face view of the jaws, a perspective view of the link and lock and of the curved central rod. Fig. 2 is a perspective view of the trap when thrown. Fig. 3 is a perspective view of the trap when set.

My invention is described as follows: The elliptical jaw $a$ is provided with perforated lugs $b$. The jaw $b'$ is provided with perforated lugs $c$ and $c'$. The two jaws are provided with hinges $d$ at each end and are pivoted together by the central curved rod $e$. Between the lugs $c$ is pivoted or otherwise loosely secured a link $f$, and in the free end of the link is pivoted a lock $g$, which is provided with a handle $h$, that the same may be easily operated. In each jaw are set five or more tine teeth $i$, bent at their free ends to penetrate the animal when the trap is thrown. A spring $j$, bent to a V shape, has its free ends pivoted, one between the lugs $b$ and the other between the lugs $c'$, so as to throw the jaws open, and thus throw the ends of the teeth together when the jaws are released, as shown in Fig. 2. Said spring has at its apex a perforation $k$, through which works a rod $l$, and through the lower end of the rod near its end is a perforation $m$, through which works the curved central rod $e$. The extreme end of this rod $e$ is bifurcated, and through these bifurcated parts are perforations $n$, and between said parts is pivoted or hinged a bait-holder $o$, provided with a notch $p$, in which the free end of the lock $g$ catches when the trap is set. Said bait-holder is also provided with notches $q$, or it may be provided with a perforation to hold the cord to tie the bait in with.

The said trap is provided with an adjustable band $r$, which may be moved up and down the spring $j$.

To set the trap I push the rod down or to the right, (as we look at the drawings,) thus bringing the central curved rod $e$ up or to the left. This throws the jaws $a$ $b'$ backward, as seen in Fig. 3. When thus thrown back, I slip the band $r$ down, as shown in Fig. 3, to keep the spring from throwing the trap and enabling one thereby to set it. Then the lock $g$ is put over the jaw $a$, and its free end placed in the notch $p$. Now the trap is set. Then I slip the band $r$ back to the apex of the spring $j$. When the animal pulls on the bait, it throws the lock $g$ out of the notch $p$, and the trap immediately closes, sinking its teeth into the animal.

Having described my invention, what I claim as new, and desire to secure by Letters Patent, is—

1. An animal trap, provided with elliptical jaws $a$ and $b'$, having end hinges $d$, and pivoted together by the central curved rod $e$; the V-shaped spring $j$ having its free ends pivoted to said jaws near their middle; lock $g$, loosely secured to jaw $b'$, by a link $f$; curved tine teeth $i$, secured in said jaws, their points adapted to come together when the trap is thrown; rod $l$, working through a perforation in the apex of the spring $j$, having near its lower end a perforation $m$, through which works the curved central rod $e$; bait-holder $o$, provided with a notch $p$, and pivoted to the lower end of the rod $l$, substantially as shown and described and for the purposes set forth.

2. An animal trap, provided with elliptical jaws $a$ and $b'$, having end hinges $d$, and pivoted together by the central curved rod $e$; the V-shaped spring $j$, having its free ends pivoted to said jaws near their middle; lock $g$, loosely secured to jaw $b'$, by a link $f$; curved tine teeth $i$, secured in said jaws, their points adapted to come together when the trap is thrown; rod $l$, working through a perforation in the apex of the spring $j$, having near its lower end a perforation $m$, through which works the curved central rod $e$; bait-holder $o$, provided with a notch $p$, and pivoted to the lower end of the rod $l$; and band $r$, adapted to be moved up and down on the spring $j$, substantially as shown and described and for the purposes set forth.

In testimony whereof I affix my signature in presence of two witnesses.

WILLIAM HENRY McWHIRTER.

Witnesses:
 JOHN D. FONTAINE,
 JESS BELL.